United States Patent
Yang

(10) Patent No.: US 11,260,533 B2
(45) Date of Patent: Mar. 1, 2022

(54) ROBOT AND ROBOT SYSTEM COMPRISING SAME

(71) Applicant: LG ELECTRONICS INC., Seoul (KR)

(72) Inventor: Sunho Yang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 380 days.

(21) Appl. No.: 16/340,546

(22) PCT Filed: Sep. 22, 2017

(86) PCT No.: PCT/KR2017/010445
§ 371 (c)(1),
(2) Date: Apr. 9, 2019

(87) PCT Pub. No.: WO2018/070687
PCT Pub. Date: Apr. 19, 2018

(65) Prior Publication Data
US 2020/0047346 A1 Feb. 13, 2020

(30) Foreign Application Priority Data
Oct. 13, 2016 (KR) .................. 10-2016-0132631

(51) Int. Cl.
*B25J 9/00* (2006.01)
*B25J 9/16* (2006.01)
(Continued)

(52) U.S. Cl.
CPC .......... *B25J 9/1697* (2013.01); *B25J 9/1664* (2013.01); *B25J 9/1679* (2013.01);
(Continued)

(58) Field of Classification Search
CPC ...... B25J 9/1697; B25J 9/1664; B25J 9/1679; B25J 11/0005; B25J 11/008; B25J 19/023; G06K 9/00261
See application file for complete search history.

(56) References Cited

U.S. PATENT DOCUMENTS

| | | | |
|---|---|---|---|
| 8,700,250 B1 | 4/2014 | Curtis et al. | |
| 9,952,593 B2* | 4/2018 | Colin | ............... G05D 1/0038 |
| 2005/0063566 A1 | 3/2005 | Beek et al. | |

FOREIGN PATENT DOCUMENTS

| | | |
|---|---|---|
| EP | 1 667 080 | 6/2006 |
| JP | 2002-092103 | 3/2002 |

(Continued)

OTHER PUBLICATIONS

JP2002-092103 in view of English Translation (Year: 2002).*

(Continued)

*Primary Examiner* — Ian Jen
(74) *Attorney, Agent, or Firm* — Ked & Associates LLP

(57) ABSTRACT

An embodiment provides a robot including an image photographing unit configured to photograph image information about boarding-scheduled persons located in a gate region differing from a set boarding gate region of a flight-scheduled airplane, an image recognizer configured to perform image processing on the image information to recognize a boarding person matching a facial image of a ticket-issued person of the flight-scheduled airplane among the boarding-scheduled persons, and a controller configured to, when the boarding person is recognized, output movement path information so that the boarding person moves to the boarding gate region.

19 Claims, 11 Drawing Sheets

(51) Int. Cl.
  *B25J 11/00*  (2006.01)
  *B25J 19/02*  (2006.01)
  *G06K 9/00*  (2022.01)
(52) U.S. Cl.
  CPC .......... *B25J 11/0005* (2013.01); *B25J 11/008* (2013.01); *B25J 19/023* (2013.01); *G06K 9/00261* (2013.01)

(56) References Cited

FOREIGN PATENT DOCUMENTS

| KR | 10-0904191 | 6/2009 |
| KR | 10-2011-0060039 | 6/2011 |
| KR | 10-1170686 | 8/2012 |

OTHER PUBLICATIONS

KR101170686 in view of English Translation (Year: 2011).*
European Search Report dated May 26, 2020 issued in EP Application No. 17859629.2.
International Search Report (with English Translation) and Written Opinion dated Jan. 10, 2018 issued in Application No. PCT/KR2017/010445.

* cited by examiner

ROBOT AND ROBOT SYSTEM COMPRISING SAME

CROSS-REFERENCE TO RELATED PATENT APPLICATIONS

This application is a U.S. National Stage Application under 35 U.S.C. § 371 of PCT Application No. PCT/KR2017/010445, filed Sep. 22, 2017, which claims priority to Korean Patent Application No. 10-2016-0132631, filed Oct. 13, 2016, whose entire disclosures are hereby incorporated by reference.

TECHNICAL FIELD

The present invention relates to a robot and a robot system including the same, and more particularly, a robot and a robot system including the same, which may provide flight change information and flight information about a flight-scheduled airplane.

BACKGROUND ART

Recently, introduction of robots and the like is being discussed for more effectively providing various services to users at public places such as airport. Users may use various services such as a road guidance service, a boarding information guidance service, and other multimedia content providing services by using robots disposed at airport.

However, in high tech devices such as robots, the cost is inevitably high, and due to this, the number of airport robots disposed at airport may be limited. Therefore, a more efficient service providing method using a limited number of airport robots may be needed.

For example, when flight change information (for example, changed information about a departure time and a boarding gate) about a flight-scheduled airplane occurs, a boarding person of the flight-scheduled airplane may recognize the flight change information transferred through indoor broadcasting at airport, but a problem where it is difficult to recognize flight schedule information may occur actually.

Recently, research is being done for providing a service which, by placing airport robots at airport, enables boarding persons of a flight-scheduled airplane, where flight change information occurs, to smoothly recognize the flight change information.

DISCLOSURE

Technical Problem

An object of an embodiment provides an airport robot which may recognize a boarding-scheduled person who will board a flight-scheduled airplane and may provide the boarding person with a movement path up to a boarding gate region of the flight-scheduled airplane.

Moreover, another object of an embodiment provides an airport robot which, when a flight change of a flight-scheduled airplane occurs, may provide flight change information to boarding persons of a flight-scheduled airplane.

Moreover, another object of an embodiment provides an airport robot which may transmit flight change information to a mobile terminal of a boarding person.

Moreover, another object of an embodiment provides an airport robot where a server which receives image information about boarding-scheduled persons located in a set region may search for a specific boarding person who will board a flight-changed flight-scheduled airplane, and then, may transmit flight change information to a specific airport robot corresponding to the specific boarding person.

Technical Solution

An airport A robot according to a first embodiment may include an image photographing unit configured to photograph image information about boarding-scheduled persons located in a gate region differing from a set boarding gate region of a flight-scheduled airplane, an image recognizer configured to perform image processing on the image information to recognize a boarding person matching a facial image of a ticket-issued person of the flight-scheduled airplane among the boarding-scheduled persons, and a controller configured to, when the boarding person is recognized, output movement path information so that the boarding person moves to the boarding gate region.

A robot according to a second embodiment may include a communication unit configured to receive facial information and mobile terminal information about a ticket-issued person of a flight-scheduled airplane and flight change information about the flight-scheduled airplane from a server, an image photographing unit configured to photograph image information about boarding-scheduled persons located in a gate region differing from a boarding gate region of the flight-scheduled airplane, an image recognizer configured to perform image processing on the image information to recognize a boarding person matching the facial information among the boarding-scheduled persons, and a controller configured to, when the boarding person is recognized, control the communication unit so that the flight change information is transmitted to a mobile terminal of the boarding person in order for the boarding person to recognize the flight change information, based on the mobile terminal information.

A robot system according to a first embodiment may include a camera configured to photograph a facial image of each of ticket-issued persons of a flight-scheduled airplane, a server configured to store mobile terminal information about each of the ticket-issued persons and the facial image mapped to mobile terminal information, and when flight change information about the flight-scheduled airplane is input from an input device, select a specific boarding person satisfying a set criterion from among the ticket-issued persons, and a plurality of robots configured to, when the server requests image information, photograph the image information about boarding-scheduled persons located in a set region and transmit the image information to the server, wherein the server may include a target recognizer configured to, when the flight change information is input, recognize boarding persons matching the facial image of each of the ticket-issued persons among the boarding-scheduled persons, based on the image information and the facial image each transmitted from the robot, a target selector configured to select the specific boarding person satisfying the set criterion among the boarding persons, and a server controller configured to, when the specific boarding person is selected, perform control so that the specific robot of the robots transfers the flight change information to the specific boarding person.

Advantageous Effects

When there is a boarding person who will board a flight-scheduled airplane, an airport robot according to an embodiment provides the boarding person with a movement path which enables the boarding person to move to a boarding gate region of the flight-scheduled airplane, thereby increasing user convenience which enables the boarding person to smoothly move to a boarding gate.

Moreover, when a flight change of a flight-scheduled airplane occurs, the airport robot according to an embodiment recognizes a boarding person located in a set range to allow the boarding person to recognize flight change information, thereby enabling the boarding person to easily board the flight-scheduled airplane.

Moreover, the airport robot according to an embodiment transmits flight change information about a flight-scheduled airplane to a mobile terminal of a boarding person, thereby enabling the boarding person to easily check the flight change information through the mobile terminal.

Moreover, in the airport robot according to an embodiment, a boarding person recognizes flight schedule information, thereby increasing efficiency in the use of time by the boarding person.

Moreover, an airport robot system according to an embodiment may check a specific boarding person who will board a currently flight-changed flight change airplane, based on image information transmitted from airport robots and may transmit flight change information to a specific airport robot close to specific boarding persons, and thus, the specific boarding persons may recognize the flight change information, thereby enabling airport robots to provide another service.

MODE FOR INVENTION

Hereinafter, embodiments relating to the present invention will be described in detail with reference to the accompanying drawings.

Figure 1:
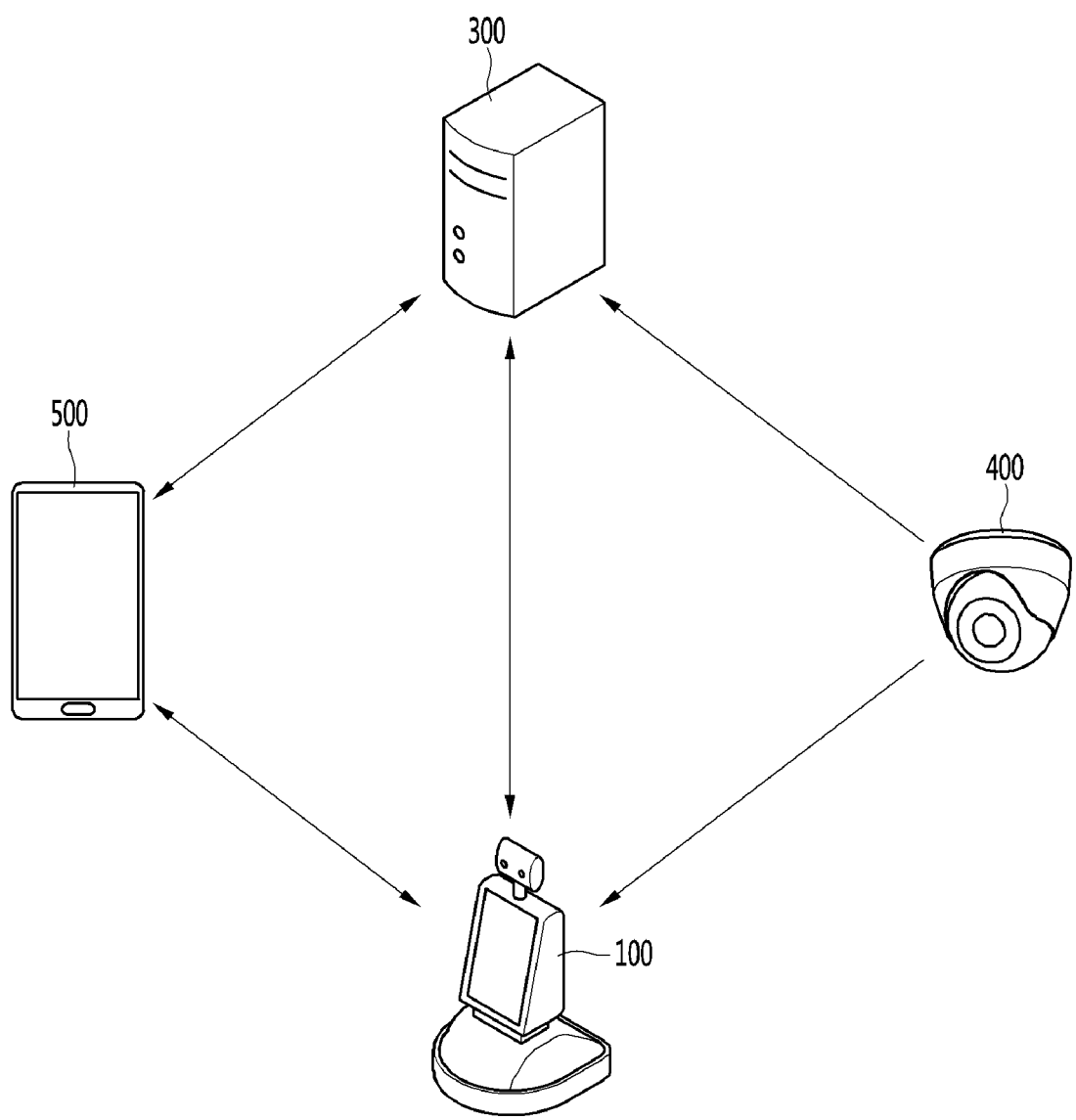
FIG. 1 is a diagram illustrating the structure of an airport robot system according to an embodiment of the present invention.

FIG. 1 is a diagram illustrating the structure of an airport robot system according to an embodiment of the present invention.

The airport robot system according to the embodiment of the present invention may include an airport robot 100, a server 300, a camera 400, and a mobile terminal 500.

The airport robot 100 may perform patrol, guidance, cleaning, disinfection and transportation within the airport.

The airport robot 100 may transmit and receive signals to and from the server 300 or the mobile terminal 500. For example, the airport robot 100 may transmit and receive signals including information on the situation of the airport to and from the server 300. In addition, the airport robot 100 may receive image information of the areas of the airport from the camera 400 in the airport.

Accordingly, the airport robot 100 may monitor the situation of the airport through the image information captured by the airport robot 100 and the image information received from the camera 400.

The airport robot 100 may directly receive a command from the user. For example, a command may be directly received from the user through input of touching the display unit provided in the airport robot 100 or voice input.

The airport robot 100 may perform patrol, guidance, cleaning, etc. according to the command received from the user, the server 300, or the mobile terminal 500.

Next, the server 300 may receive information from the airport robot 100, the camera 400, and/or the mobile terminal 500. The server 300 may collect, store and manage the information received from the devices. The server 300 may transmit the stored information to the airport robot 100 or the mobile terminal 500. In addition, the server 300 may transmit command signals to a plurality of the airport robots 100 disposed in the airport.

The camera 400 may include a camera installed in the airport. For example, the camera 400 may include a plurality of closed circuit television (CCTV) cameras installed in the airport, an infrared thermal-sensing camera, etc. The camera 400 may transmit the captured image to the server 300 or the airport robot 100.

The mobile terminal 500 may transmit and receive data to and from the server 300 in the airport. For example, the mobile terminal 500 may receive airport related data such as a flight time schedule, an airport map, etc. from the server 300.

A user may receive necessary information of the airport from the server 300 through the mobile terminal 500. In addition, the mobile terminal 500 may transmit data such as a photo, a moving image, a message, etc. to the server 300. For example, the user may transmit the photograph of a missing child to the server 300 to report the missing child or photograph an area of the airport where cleaning is required through the camera to request cleaning of the area.

In addition, the mobile terminal 500 may transmit and receive data to and from the airport robot 100.

For example, the mobile terminal 500 may transmit, to the airport robot 100, a signal for calling the airport robot 100, a signal for instructing that specific operation is performed, or an information request signal. The airport robot 100 may move to the position of the mobile terminal 500 or perform operation corresponding to the instruction signal in response to the call signal received from the mobile terminal 500. Alternatively, the airport robot 100 may transmit data corresponding to the information request signal to the mobile terminal 500 of the user.

Figure 2:
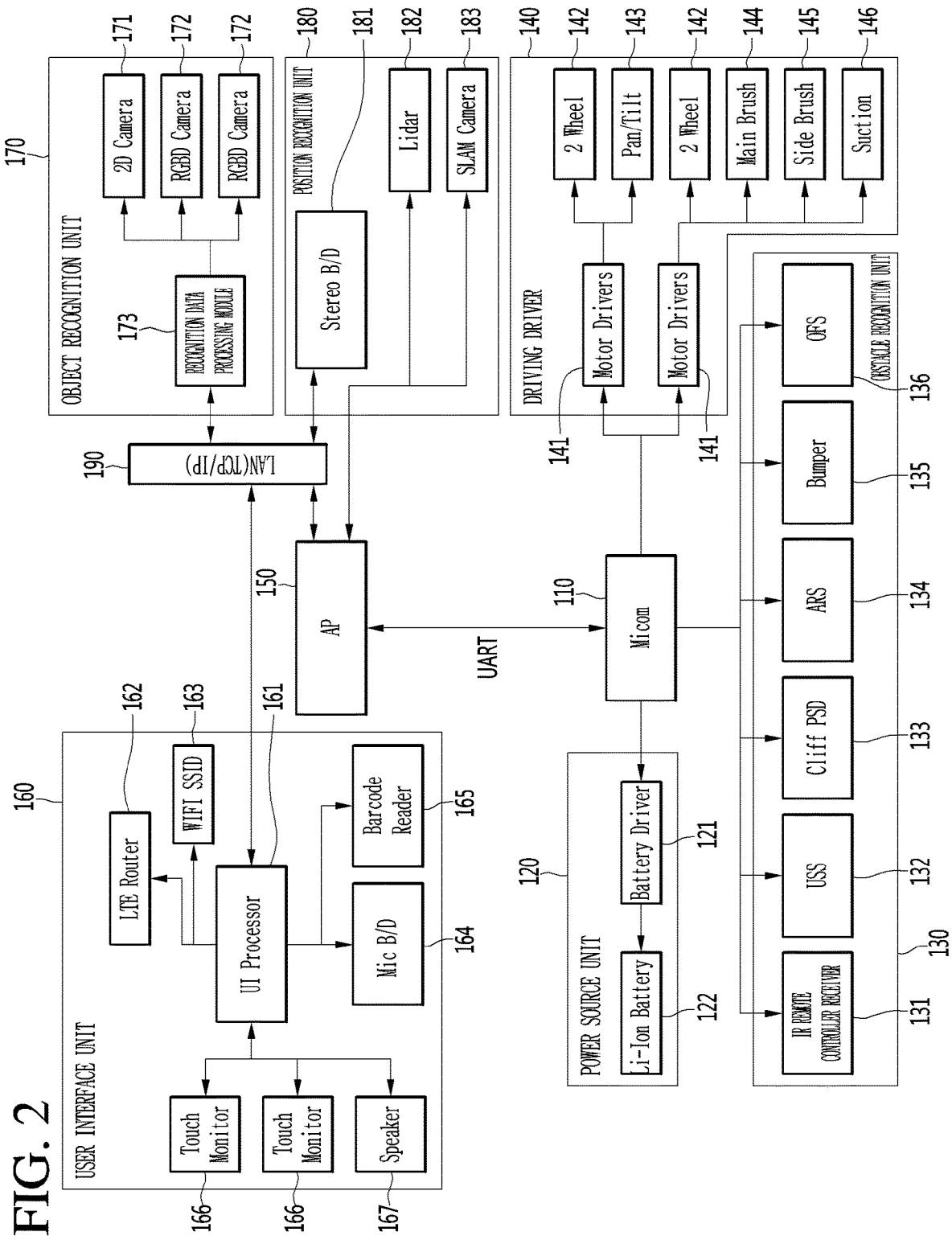
FIG. 2 is a block diagram illustrating a hardware configuration of an airport robot according to an embodiment of the present invention.

FIG. 2 is a block diagram illustrating a hardware configuration of an airport robot according to an embodiment of the present invention.

As illustrated in FIG. 2, hardware of the airport robot according to an embodiment of the present invention may be configured with a microcomputer group and an AP group.

The microcomputer group may include a microcomputer 110, a power source unit 120, an obstacle recognition unit 130, and a driving driver 140.

The microcomputer 110 may manage the power source unit 120 including a battery of the hardware of the airport robot, the obstacle recognition unit 130 including various kinds of sensors, and the driving driver 140 including a plurality of motors and wheels.

The power source unit 120 may include a battery driver 121 and a lithium-ion (li-ion) battery 122. The battery driver 121 may manage charging and discharging of the li-ion battery 122. The li-ion battery 122 may supply power for driving the airport robot. The li-ion battery 122 may be configured by connecting two 24V/102A li-ion batteries in parallel.

The obstacle recognition unit 130 may include an infrared (IR) remote controller receiver 131, an ultrasonic sensor (USS) 132, a cliff PSD 133, an attitude reference system (ARS) 134, a bumper 135, and an optical flow sensor (OFS) 136. The IR remote controller receiver 131 may include a sensor which receives a signal from an IR remote controller for remotely controlling the airport robot. The USS 132 may include a sensor for determining a distance between an obstacle and the airport robot by using an ultrasonic signal. The cliff PSD 133 may include a sensor for sensing a precipice or a cliff within a forward-direction airport robot driving range of 360 degrees. The ARS 134 may include a sensor for detecting a gesture of the airport robot. The ARS 134 may include a sensor which is configured with an acceleration 3-axis and a gyro 3-axis for detecting the number of rotations. The bumper 135 may include a sensor which senses a collision between the airport robot and an obstacle. The sensor included in the bumper 135 may sense a collision between the airport robot and an obstacle within a 360-degree range. The OFS 136 may include a sensor for measuring a phenomenon where a wheel is spinning in driving of the airport robot and a driving distance of the airport robot on various floor surfaces.

The driving driver 140 may include a motor driver 141, a wheel motor 142, a rotation motor 143, a main brush motor 144, a side brush motor 145, and a suction motor 146. The motor driver 141 may perform a function of driving the wheel motor, the brush motor, and suction motor for driving and cleaning of the airport robot. The wheel motor 142 may drive a plurality of wheels for driving of the airport robot. The rotation motor 143 may be driven for a lateral rotation and a vertical rotation of a head unit of the airport robot or a main body of the airport robot, or may be driven the direction change or rotation of a wheel of the airport robot. The main brush motor 144 may drive a brush which sweeps filth on an airport floor. The side brush motor 145 may drive a brush which sweeps filth in a peripheral area of an outer surface of the airport robot. The suction motor 146 may be driven for sucking filth on the airport floor.

The AP group may include an AP 150, a user interface unit 160, an object recognition unit 170, a position recognition unit 180, and a local area network (LAN) 190.

The AP 150 may function as a central processing unit which manages a whole hardware module system of the airport robot. The AP 150 may transmit, to the microcomputer 110, user input/output information and application program driving information for driving by using position information obtained through various sensors, thereby allowing a motor or the like to be performed.

The user interface unit 160 may include a user interface (UI) processor 161, a long term evolution (LTE) router 162, a WIFI SSID 163, a microphone board 164, a barcode reader 165, a touch monitor 166, and a speaker 167. The user interface processor 161 may control an operation of the user interface unit which performs an input/output of a user. The LTE router 162 may receive necessary information from the outside and may perform LTE communication for transmitting information to the user. The WIFI SSID 163 may analyze WIFI signal strength to perform position recognition on a specific object or the airport robot. The microphone board 164 may receive a plurality of microphone signals, process a sound signal into sound data which is a digital signal, and analyze a direction of the sound signal and a corresponding sound signal. The barcode reader 165 may read barcode information described in a plurality of targets used in airport. The touch monitor 166 may include a monitor for displaying output information and a touch panel which is configured for receiving the input of the user. The speaker 167 may inform the user of specific information through a voice.

The object recognition unit 170 may include a two-dimensional (2D) camera 171, a red, green, blue, and distance (RGBD) camera 172, and a recognition data processing module 173. The 2D camera 171 may be a sensor for recognizing a person or an object on the basis of a 2D image. The RGBD camera 172 may be a camera including RGBD sensors or may be a sensor for detecting a person or an object by using captured images including depth data obtained from other similar three-dimensional (3D) imaging devices. The recognition data processing module 173 may process a signal such as 2D image/video or 3D image/video obtained from the 2D camera and the RGBD camera 172 to recognize a person or an object.

The position recognition unit 180 may include a stereo board (B/D) 181, a light detection and ranging (LIDAR) 182, and a simultaneous localization and mapping (SLAM) camera 183. The SLAM camera 183 may implement simultaneous position tracing and mapping technology. The airport robot may detect ambient environment information by suing the SLAM camera 183 and may process obtained information to generate a map corresponding to a duty performing space and simultaneously estimate its absolute position. The LIDAR 182, a laser radar, may be a sensor which irradiates a laser beam and collects and analyzes rearward-scattered light of light absorbed or scattered by aerosol to perform position recognition. The stereo board 181 may process sensing data collected from the LIDAR 182 and the SLAM camera 183 to manage data for recognizing a position of the airport robot and an obstacle.

The LAN 190 may perform communication with the user interface processor 161 associated with a user input/output, the recognition data processing module 173, the stereo board 181, and the AP 150.

Figure 3:
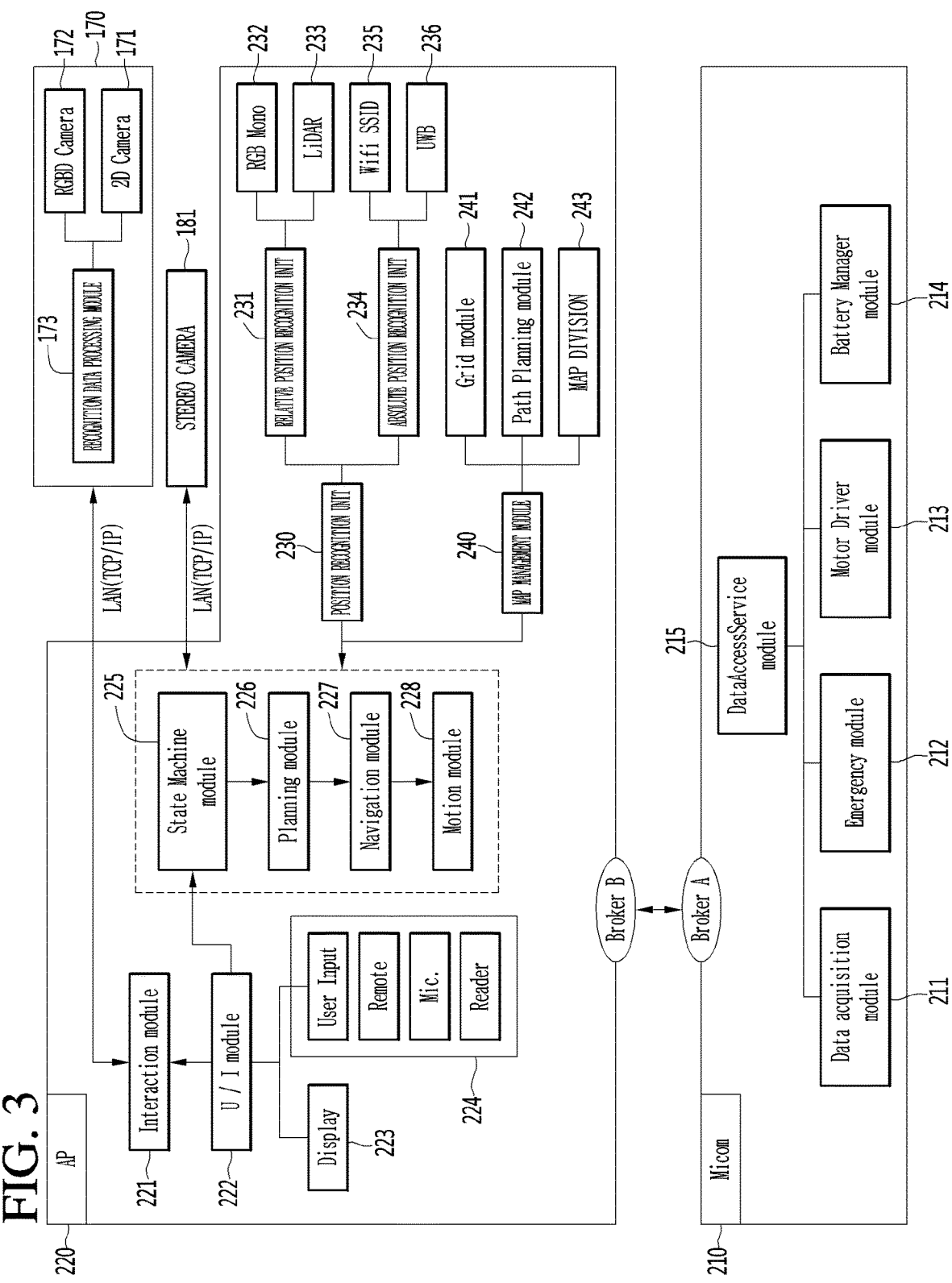
FIG. 3 is a diagram illustrating in detail a configuration of each of a microcomputer and an application processor (AP) of an airport robot according to another embodiment of the present invention.

FIG. 3 is a diagram illustrating in detail a configuration of each of a microcomputer and an AP of an airport robot according to another embodiment of the present invention.

As illustrated in FIG. 3, a microcomputer 210 and an AP 220 may be implemented as various embodiments, for controlling recognition and action of the airport.

For example, the microcomputer 210 may include a data access service module 215. The data access service module 215 may include a data acquisition module 211, an emergency module 212, a motor driver module 213, and a battery manager module 214. The data acquisition module 211 may acquire data sensed from a plurality of sensors included in the airport robot and may transfer the acquired data to the data access service module 215. The emergency module 212 may be a module for sensing an abnormal state of the airport robot, and when the airport robot performs a predetermined type action, the emergency module 212 may sense that the airport robot is in the abnormal state. The motor driver module 213 may manage a wheel, a brush, and driving control of a suction motor for driving and cleaning of the airport robot. The battery manager module 214 may manage charging and discharging of the li-ion battery 122 of FIG. 2 and may transfer a battery state of the airport robot to the data access service module 215.

The AP 220 may receive, recognize, and process a user input and the like to control an operation of the airport robot with various cameras and sensors. An interaction module 221 may be a module which synthesizes recognition data received from the recognition data processing module 173 and a user input received from a user interface module 222 to manage software exchanged between a user and the airport robot. The user interface module 222 may receive a close-distance command of the user such as a key, a touch screen, a reader, and a display unit 223 which is a monitor for providing manipulation/information and a current situation of the airport robot, or may receive a long-distance signal such as a signal of an IR remote controller for remotely controlling the airport robot, or may manage a user input received of a user input unit 224 receiving an input signal of the user from a microphone, a barcode reader, or the like. When one or more user inputs are received, the user interface module 222 may transfer user input information to a state machine module 225. The state machine module 225 which has received the user input information may manage a whole state of the airport robot and may issue an appropriate command corresponding to a user input. A planning module 226 may determine a start time and an end time/action for a specific operation of the airport robot according to the command transferred from the state machine module 225 and may calculate a path through which the airport will move. A navigation module 227 may be a module which manages overall driving of the airport robot and may allow the airport robot to drive along a driving path calculated by the planning module 226. A motion module 228 may allow the airport robot to perform a basic operation in addition to driving.

Moreover, the airport robot according to another embodiment of the present invention may include a position recognition unit 230. The position recognition unit 230 may include a relative position recognition unit 231 and an absolute position recognition unit 234. The relative position recognition unit 231 may correct a movement amount of the airport robot through an RGM mono sensor 232, calculate a movement amount of the airport robot for a certain time, and recognize an ambient environment of the airport robot through a LIDAR 233. The absolute position recognition unit 234 may include a WIFI SSID 235 and a UWB 236. The WIFI SSID 235 may be an UWB sensor module for recognizing an absolute position of the airport robot and may be a WIFI module for estimating a current position through WIFI SSID sensing. The WIFI SSID 235 may analyze WIFI signal strength to recognize a position of the airport robot. The UWB 236 may calculate a distance between a transmission unit and a reception unit to sense the absolute position of the airport robot.

Moreover, the airport robot according to another embodiment of the present invention may include a map management module 240. The map management module 240 may include a grid module 241, a path planning module 242, and a map division module 243. The grid module 241 may manage a lattice type map generated by the airport robot through an SLAM camera or map data of an ambient environment, previously input to the airport robot, for position recognition. In map division for cooperation between a plurality of airport robots, the path planning module 242 may calculate driving paths of the airport robots. Also, the path planning module 242 may calculate a driving path through which the airport robot will move. Also, the path planning module 242 may calculate a driving path through which the airport robot will move in an environment where one airport robot operates. The map division module 243 may calculate in real time an area which is to be managed by each of a plurality of airport robots.

Pieces of data sensed and calculated from the position recognition unit 230 and the map management module 240 may be again transferred to the state machine module 225. The state machine module 225 may issue a command to the planning module 226 so as to control an operation of the airport robot, based on the pieces of data sensed and calculated from the position recognition unit 230 and the map management module 240.

Figure 4:
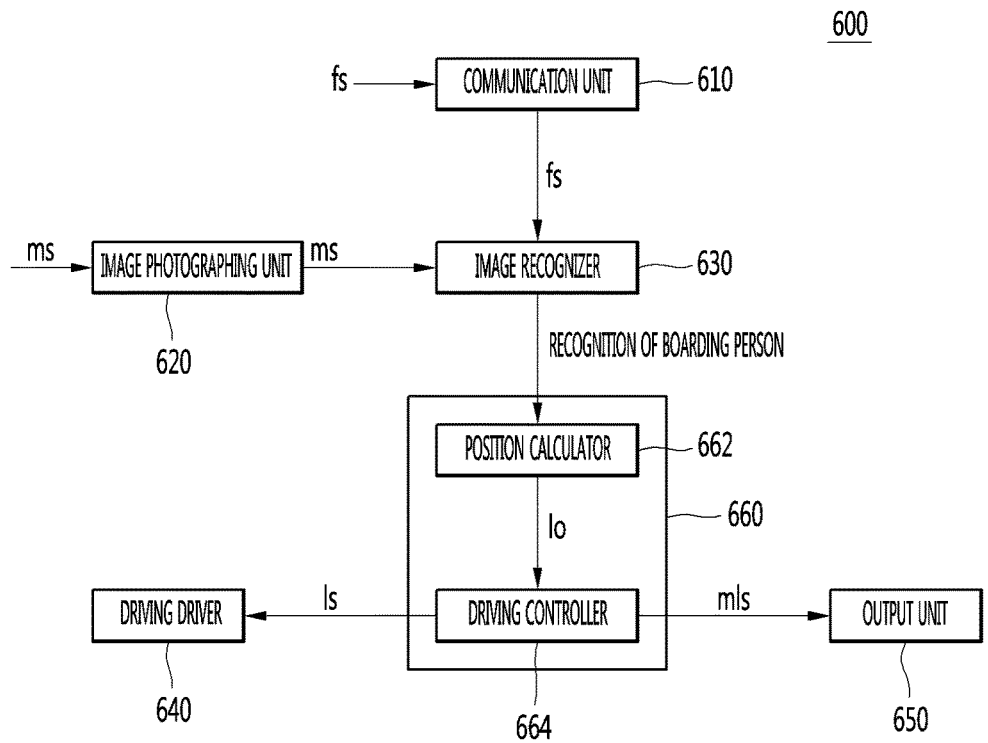
FIG. 4 is a block diagram illustrating a control configuration of an airport robot according to a first embodiment.

FIG. 4 is a block diagram illustrating a control configuration of an airport robot according to a first embodiment.

FIG. 4 illustrates a control configuration needed for a boarding person to recognize flight change information (or ticket change information) about a configuration of the airport robot illustrated in FIGS. 2 and 3. In the control configuration illustrated in FIG. 4 and the configurations illustrated in FIGS. 2 and 3, an element may be added, or the term may be changed.

Referring to FIG. 4, an airport robot 600 may include a communication unit (or communication interface) 610, an image photographing unit 620, an image recognizer 630, a driving driver 640, an output unit 650, and a controller 660.

In an embodiment, it will be described that the airport robot 600 is located in another gate region differing from a boarding gate region of a flight-scheduled airplane at a current time, and when a boarding person of the flight-scheduled airplane is located in the other gate region, the airport robot 600 provides the boarding person with a service which allows the boarding person to move the boarding gate region of the flight-scheduled airplane.

Here, the communication unit 610 may receive a facial image fs of a ticket-issued person of a flight-scheduled airplane from a server (not shown) disposed at airport.

In an embodiment, the communication unit 610 may be the LTE router 162 included in the user interface unit 160 illustrated in FIG. 2, but is not limited thereto.

The communication unit 610 may transfer the facial image fs to at least one of the image recognizer 630 and the controller 660, but is not limited thereto.

The image photographing unit 620 may photograph image information ms about boarding-scheduled persons located in a current gate region differing from the boarding gate region.

In an embodiment, the image photographing unit 620 may be the 2D camera 171 and the RGBD camera each illustrated in FIG. 2, but is not limited thereto.

The image photographing unit 620 may continually photograph, by units of set sectors, the boarding-scheduled persons located in the current gate region and may transfer a captured image to the image recognizer 630 and the controller 660.

At this time, the image photographing unit 620 may operate according to control by the controller 660 or may automatically operate based on a preset schedule of a flight-scheduled airplane, but is not limited thereto.

The image recognizer 630 may perform image processing on the image information ms transferred from the image photographing unit 620 to recognize, as a boarding-scheduled person, a boarding person matching the facial image fs of the ticket-issued person of the flight-scheduled airplane among the boarding-scheduled persons located in the current gate region.

In an embodiment, the image recognizer 630 may be the recognition data processing module 173 illustrated in FIG. 2, but is not limited thereto.

The image recognizer 630 may match the transferred facial image fs with facial images (not shown) of the boarding-scheduled persons included in the image information ms in a one-to-one relationship to recognize the same boarding-scheduled person as the boarding person.

Subsequently, the image recognizer 630 may transfer a recognition result of the boarding person to the controller 660.

The driving driver 640 may drive a motor to a position corresponding to a position of the boarding person recognized by the image recognizer 630 according to control by the controller 660 to move.

In an embodiment, the driving driver 640 may be the same as the driving driver 140 illustrated in FIG. 2, but is not limited thereto.

The output unit 650 may output movement path information mls in order for the boarding person to move to the boarding gate region, based on control by the controller 660.

In an embodiment, the output unit 650 may be the touch monitor 166 which is included in the user interface unit 160 illustrated in FIG. 2 and displays the movement path information mls and the speaker 167 which is included in the user interface unit 160 illustrated in FIG. 2 and guides the movement path information mls as a voice, but is not limited thereto.

The controller 660 may include a position calculator 662 and a driving controller 666.

Here, the controller 660 may be at least one of the microcomputer 110 and the AP 150 each illustrated in FIG. 2, but is not limited thereto.

When the image recognizer 630 recognizes the boarding person, the position calculator 662 may calculate a position lo of the boarding person from the image information ms.

That is, the position calculator 662 may calculate the position lo of the boarding person, based on a size of an image pixel of the image information ms including the boarding person, a photographing angle of the image photographing unit 620, and a current position (a position of an airport robot), and by using another method, the position calculator 662 may calculate the position lo of the boarding person.

Subsequently, the position calculator 662 may transfer the position lo of the boarding person to the driving controller 664.

When the position lo of the boarding person is transferred, the driving controller 664 may determine a set position ls corresponding to the position lo of the boarding person.

Here, the set position ls may include a front or side position spaced apart from the boarding person by a certain distance, based on the position lo of the boarding person, but is not limited thereto.

Subsequently, the driving controller 664 may generate the movement path information mls including at least one of a movement path from the position lo of the boarding person to the boarding gate region, a movement time, and a boarding start time.

The driving controller 664 may generate the movement path information mls, and then, may control the driving driver 640 so as to be moved to the set position ls.

Subsequently, when the driving controller 664 controls the driving driver 640 to move to the set position ls, the driving controller 664 may control the output unit 650 to output the movement path information mls to the boarding person.

The airport robot 600 according to an embodiment recognizes, as a boarding person, a boarding-scheduled person matching a ticket-issued person of a flight-scheduled airplane among boarding-scheduled persons located in a gate region (i.e., a gate region spaced apart from a boarding gate region in position) differing from the boarding gate region of a current flight-scheduled airplane and outputs movement path information mls in order for the boarding person to quickly move to the boarding gate region, thereby enabling the boarding person to smoothly board the flight-scheduled airplane. Accordingly, the airport robot 600 according to an embodiment provides a service for increasing convenience of a user.

Figure 5:
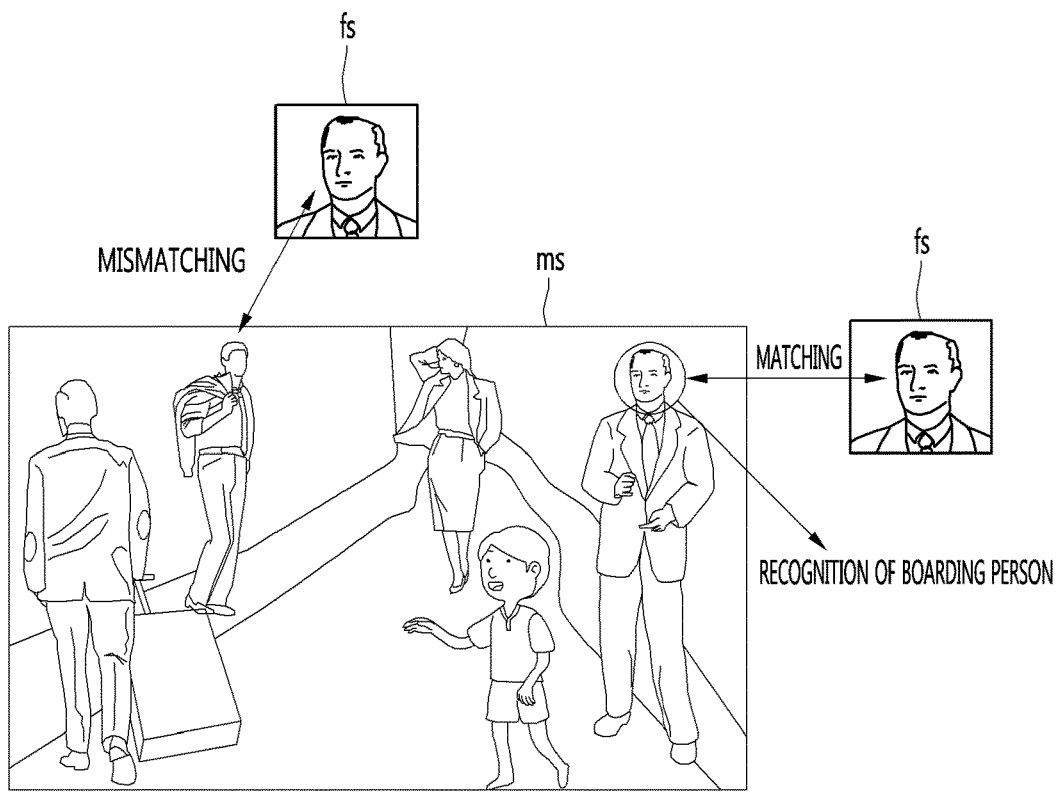
FIGS. 5 to 7 are operation diagrams illustrating an operation of the airport robot illustrated in FIG. 4.
Figure 6:
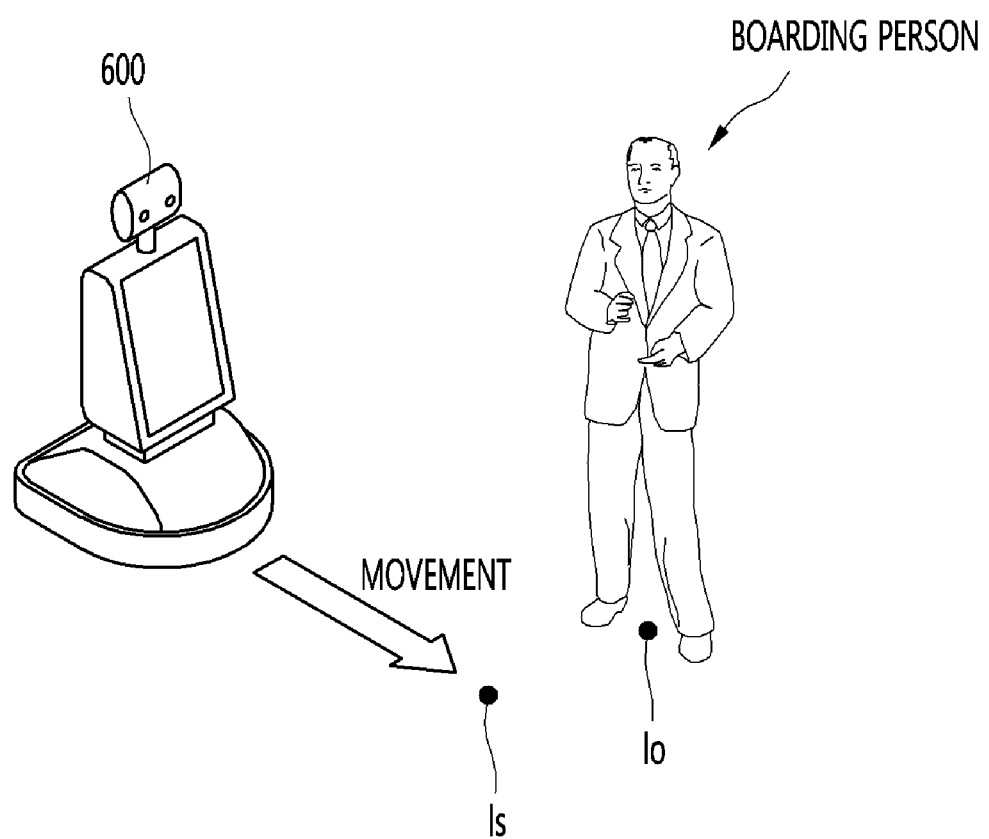
Figure 7:
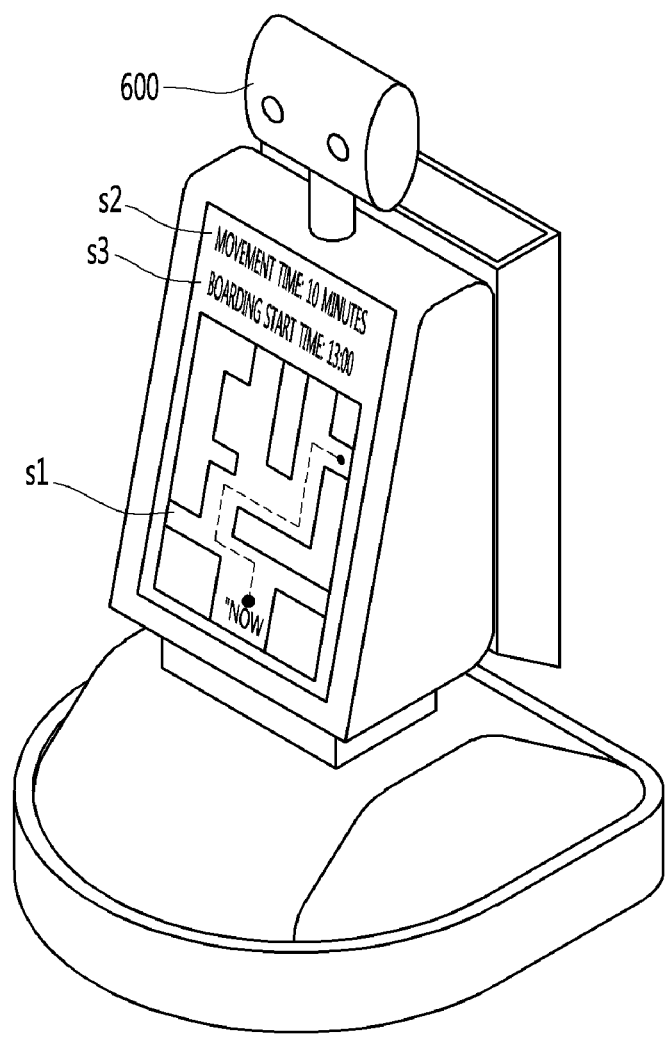

FIGS. 5 to 7 are operation diagrams illustrating an operation of the airport robot illustrated in FIG. 4.

FIGS. 5 to 7 are operation diagrams illustrating an internal operation and an external operation of the airport robot 600 and illustrate one example.

FIG. 5 is a diagram where the airport robot 600 recognizes a boarding-scheduled person matching a facial image fs of a ticket-issued person of a flight-scheduled airplane in photographed image information ms to recognize a boarding person of the flight-scheduled airplane, and a diagram is attached for convenience of description as being recognized through an internal algorithm.

Referring to FIG. 5, in order to recognize a boarding person of a flight-scheduled airplane in another gate region spaced apart from a boarding gate region of the flight-scheduled airplane, the airport robot 600 may receive a facial image fs, transmitted from a server (not shown), of a ticket-issued person of the flight-scheduled airplane and may photograph image information ms about boarding-scheduled persons located in the gate region.

Subsequently, the airport robot 600 may recognize, as a boarding person, a boarding-scheduled person matching the facial image fs among the boarding-scheduled persons included in the image information ms.

FIG. 6 is a diagram where the airport robot 600 recognizes a boarding person, and then, moves to a set position lo corresponding to a position of the boarding person.

Referring to FIG. 6, when a boarding person is recognized, the airport robot 600 may calculate a position of the boarding person on the basis of the image information ms and may move to a set position ls corresponding to a position lo of the boarding person.

At this time, the airport robot 600 may internally generate flight path information mls about the flight-scheduled airplane and may move the set position ls.

FIG. 7 is a diagram where the airport robot 600 moves to a set position ls, and then, outputs flight path information mls to a boarding person.

Referring to FIG. 7, when a boarding person moves to a set position lo corresponding to a position of the boarding person, the airport robot 600 may output flight path information mls in order for the boarding person to recognize the flight path information mls.

At this time, as in FIG. 7, the airport robot 600 may display the flight path information mls on the output unit 650 (for example, a touch monitor) and may output the flight path information mls as a guidance voice through a speaker, but is not limited thereto.

As illustrated in FIG. 7, the flight path information mls may include at least one of a movement path s1 from a position of the boarding person to a boarding gate region of a flight-scheduled airplane, a movement time s2, and a boarding start time s3, but is not limited thereto.

Figure 8:
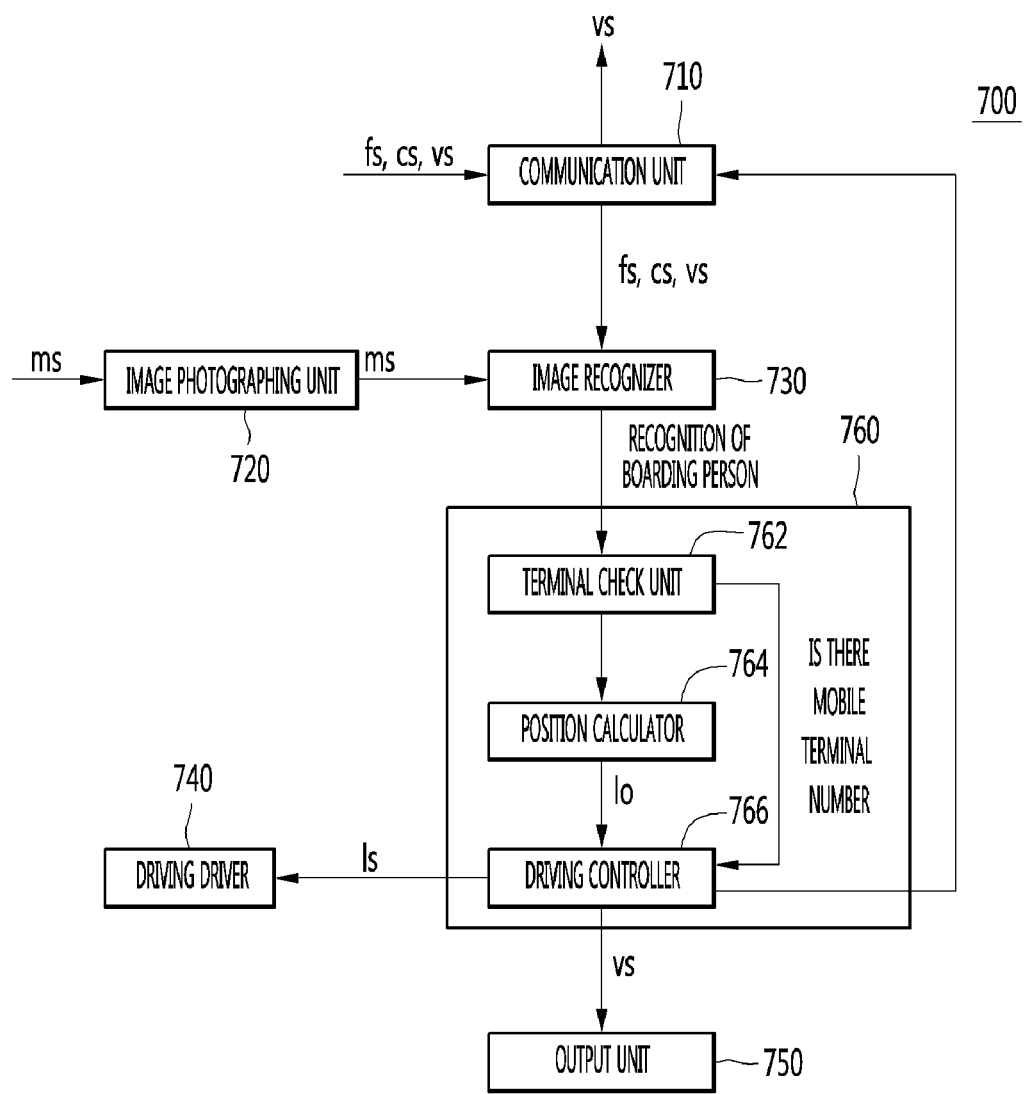
FIG. 8 is a block diagram illustrating a control configuration of an airport robot according to a second embodiment.

FIG. 8 is a block diagram illustrating a control configuration of an airport robot according to a second embodiment.

Referring to FIG. 8, an airport robot 700 may include a communication unit 710, an image photographing unit 720, an image recognizer 730, a driving driver 740, an output unit 750, and a controller 760.

In an embodiment, it will be described that the airport robot 700 is located in another gate region differing from a boarding gate region of a flight-scheduled airplane at a current time, and when a boarding person of the flight-scheduled airplane is located in the other gate region, the airport robot 700 provides the boarding person with a service which allows the boarding person to move the boarding gate region of the flight-scheduled airplane.

Here, the communication unit 710 may receive a facial image fs and a mobile terminal information cs of a ticket-issued person of a flight-scheduled airplane and flight change information vs of the flight-scheduled airplane from a server (not shown) disposed at airport.

In an embodiment, the communication unit 710 may be the LTE router 162 included in the user interface unit 160 illustrated in FIG. 2, but is not limited thereto.

The communication unit 710 may transfer the facial image fs, the mobile terminal information cs, and the flight change information vs about the flight-scheduled airplane to at least one of the image recognizer 730 and the controller 760, but is not limited thereto.

The image photographing unit 720 may photograph image information ms about boarding-scheduled persons located in a current gate region differing from the boarding gate region.

In an embodiment, the image photographing unit 720 may be the 2D camera 171 and the RGBD camera each illustrated in FIG. 2, but is not limited thereto.

The image photographing unit 720 may continually photograph, by units of set sectors, the boarding-scheduled persons located in the current gate region and may transfer a captured image to the image recognizer 730 and the controller 760.

At this time, the image photographing unit 720 may operate according to control by the controller 760 or may automatically operate based on a preset schedule of a flight-scheduled airplane, but is not limited thereto.

The image recognizer 730 may perform image processing on the image information ms transferred from the image photographing unit 720 to recognize, as a boarding-scheduled person, a boarding person matching the facial image fs of the ticket-issued person of the flight-scheduled airplane among the boarding-scheduled persons located in the current gate region.

In an embodiment, the image recognizer 730 may be the recognition data processing module 173 illustrated in FIG. 2, but is not limited thereto.

The image recognizer 730 may match the transferred facial image fs with facial images (not shown) of the boarding-scheduled persons included in the image information ms in a one-to-one relationship to recognize the same boarding-scheduled person as the boarding person.

Subsequently, the image recognizer 730 may transfer a recognition result of the boarding person to the controller 760.

The driving driver 740 may drive a motor to a position corresponding to a position of the boarding person recognized by the image recognizer 730 according to control by the controller 760 to move.

In an embodiment, the driving driver 740 may be the same as the driving driver 140 illustrated in FIG. 2, but is not limited thereto.

The output unit 750 may output movement path information mls in order for the boarding person to move to the boarding gate region, based on control by the controller 760.

In an embodiment, the output unit 750 may be the touch monitor 166 which is included in the user interface unit 160 illustrated in FIG. 2 and displays the movement path information mls and the speaker 167 which is included in the user interface unit 160 illustrated in FIG. 2 and guides the movement path information mls as a voice, but is not limited thereto.

The controller 760 may include a terminal check unit 762, a position calculator 764, and a driving controller 766.

Here, the controller 760 may be at least one of the microcomputer 110 and the AP 150 each illustrated in FIG. 2, but is not limited thereto.

When the image recognizer 730 recognizes the boarding person, the terminal check unit 762 may check whether there is a mobile terminal number included in mobile terminal information cs.

That is, the terminal check unit 762 may check whether mobile terminal number is included in mobile terminal information cs, for transmitting flight change information vs to a mobile terminal of a boarding person, and may transfer the flight change information vs to the driving controller 766.

When the image recognizer 730 recognizes the boarding person, the position calculator 764 may calculate a position lo of the boarding person from the image information ms according to control by the driving controller 766.

That is, the position calculator 764 may calculate the position lo of the boarding person, based on a size of an image pixel of the image information ms including the boarding person, a photographing angle of the image photographing unit 720, and a current position (a position of an airport robot), and by using another method, the position calculator 764 may calculate the position lo of the boarding person.

Subsequently, the position calculator 764 may transfer the position lo of the boarding person to the driving controller 766.

When it is checked by the terminal check unit 764 that there is the mobile terminal number, the driving controller 766 may control the communication unit 710 to transmit flight change information vs to the mobile terminal number.

Moreover, when it is checked by the terminal check unit 764 that there is not the mobile terminal number, the driving controller 766 may control the position calculator to calculate a position of the boarding person.

Subsequently, when the position lo of the boarding person is transferred, the driving controller 766 may determine a set position ls corresponding to the position lo of the boarding person.

Here, the set position ls may include a front or side position spaced apart from the boarding person by a certain distance, based on the position lo of the boarding person, but is not limited thereto.

Subsequently, the driving controller 766 may control the output unit 750 to move to the set position ls and to output the flight change information vs to the boarding person.

Figure 9:
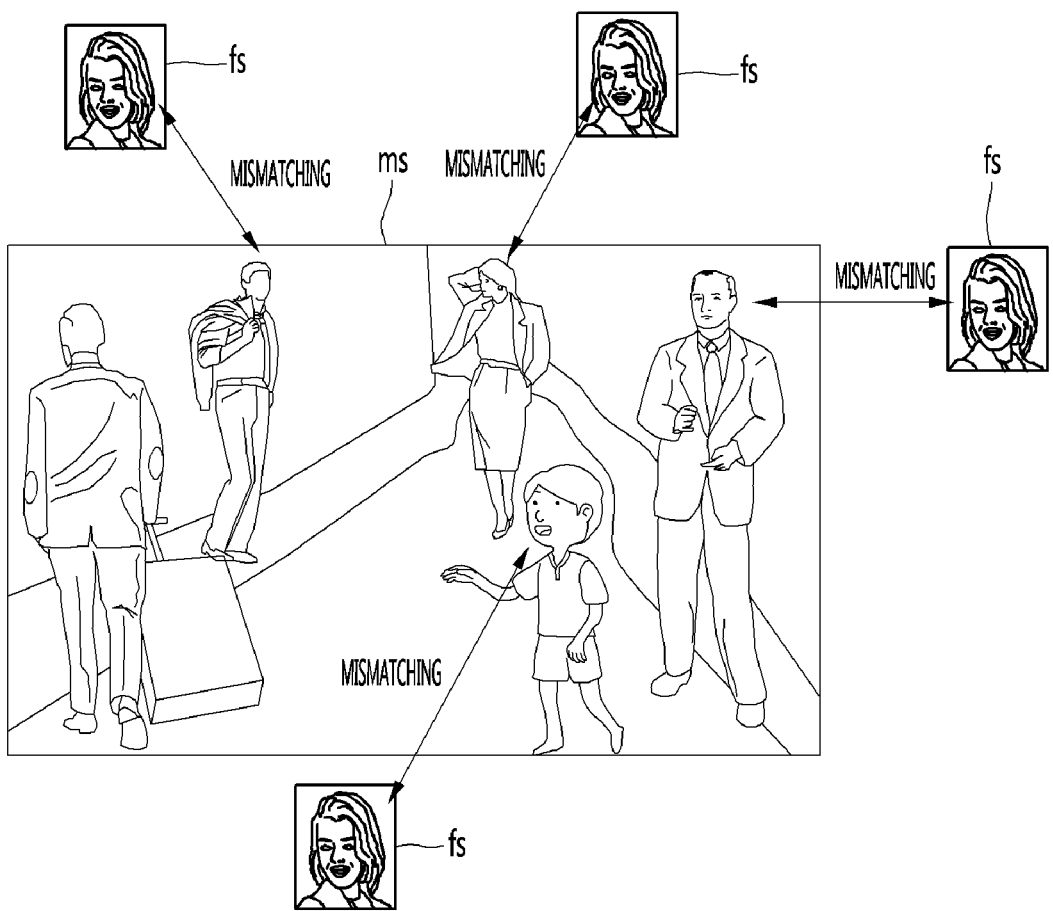
FIGS. 9 to 11 are operation diagrams illustrating an operation of the airport robot illustrated in FIG. 8.
Figure 10:
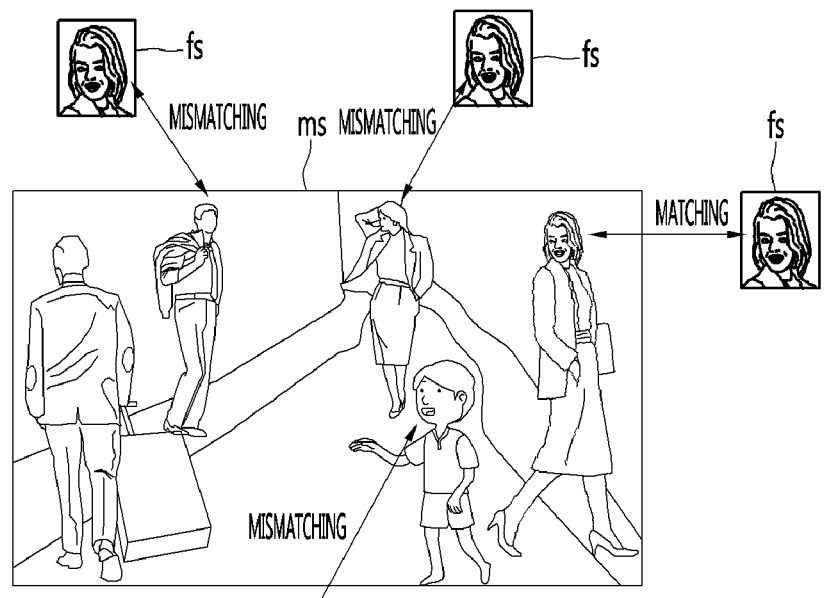
Figure 10:
Figure 10:
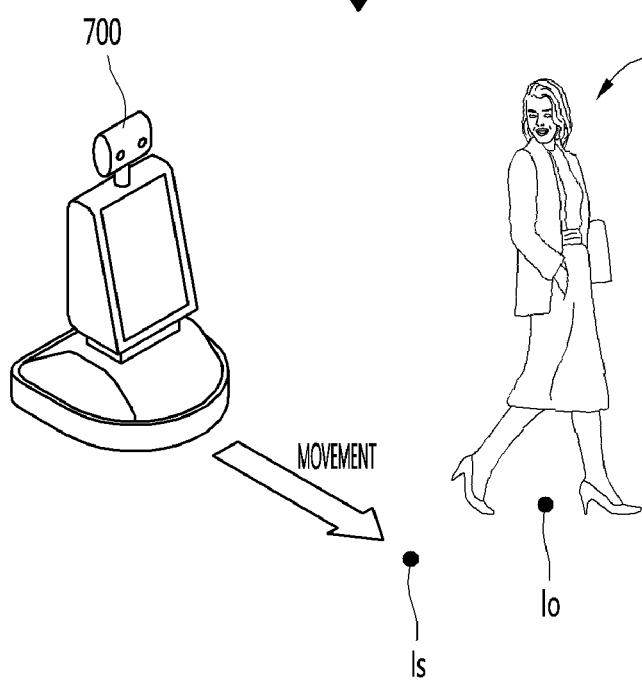
Figure 11:
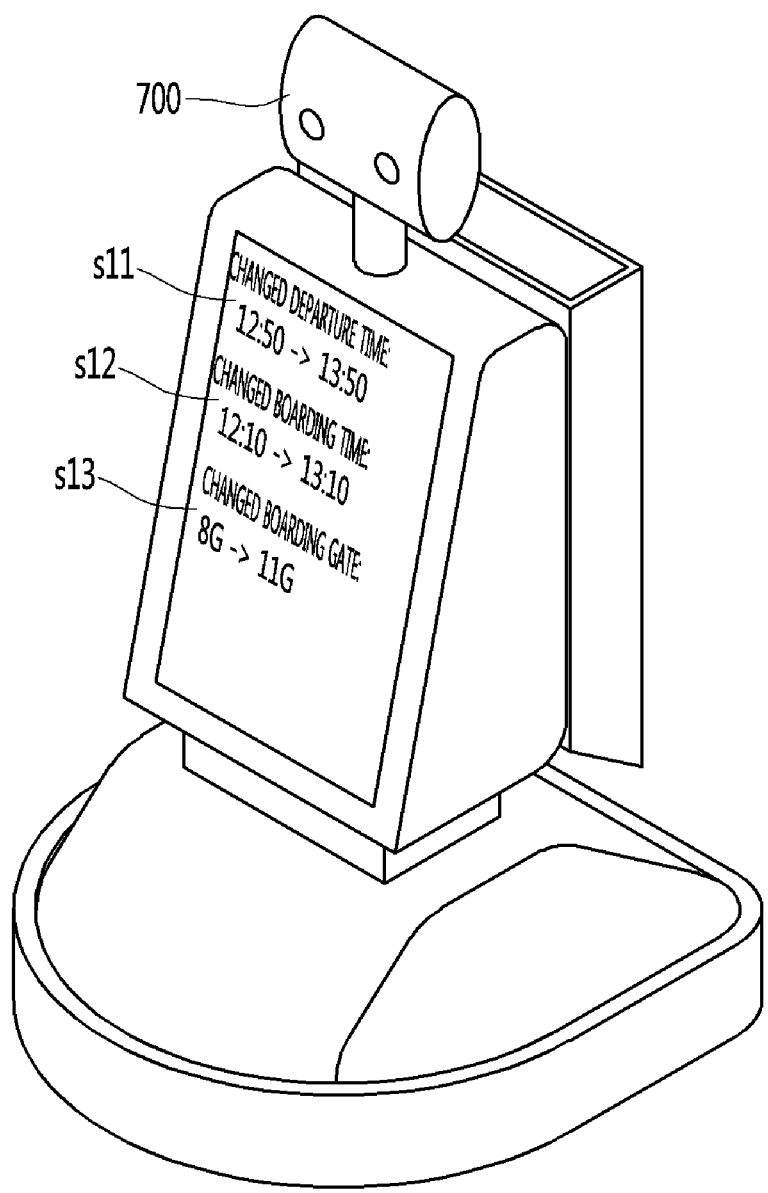

FIGS. 9 to 11 are operation diagrams illustrating an operation of the airport robot illustrated in FIG. 8.

FIGS. 9 to 11 are operation diagrams illustrating an internal operation and an external operation of the airport robot 700 and illustrate one example.

FIG. 9 is a diagram where the airport robot 700 recognizes a boarding-scheduled person matching a facial image fs of a ticket-issued person of a flight-scheduled airplane in photographed image information ms to recognize a boarding person of the flight-scheduled airplane, and a diagram is attached for convenience of description as being recognized through an internal algorithm.

Referring to FIG. 9, in order to recognize a boarding person of a flight-scheduled airplane in another gate region spaced apart from a boarding gate region of the flight-scheduled airplane, the airport robot 700 may receive a facial image fs, transmitted from a server (not shown), of a ticket-issued person of the flight-scheduled airplane and may photograph image information ms about boarding-scheduled persons located in the gate region.

Subsequently, the airport robot 700 may recognize, as a boarding person, a boarding-scheduled person matching the facial image fs among the boarding-scheduled persons included in the image information ms.

At this time, the airport robot 700 may transmit flight change information vs to a mobile terminal number included in mobile terminal information cs about the boarding person.

Unlike FIG. 9 described above, FIG. 10 is a diagram where the airport robot 700 moves to a set position ls when the airport robot 700 recognizes a boarding person in image information ms and may be the same as FIG. 6.

Referring to FIG. 10, when a boarding person is recognized, the airport robot 700 may calculate a position of the boarding person on the basis of the image information ms and may move to the set position ls corresponding to the position of the boarding person.

FIG. 11 is a diagram where the airport robot 700 moves to the set position ls, and then, outputs flight change information vs to a boarding person.

Referring to FIG. 11, when a boarding person moves to a set position lo corresponding to a position of the boarding person, the airport robot 700 may output flight change information vs in order for the boarding person to recognize the flight change information vs.

At this time, as in FIG. 8, the airport robot 700 may display the flight change information vs on the output unit 750 (for example, a touch monitor) and may output the flight change information vs as a guidance voice through a speaker, but is not limited thereto.

As illustrated in FIG. 11, the flight change information vs may include at least one of a changed departure time s11, a changed boarding time s12, and a changed boarding gate s13 each corresponding to the flight-scheduled airplane, but is not limited thereto.

Figure 12:
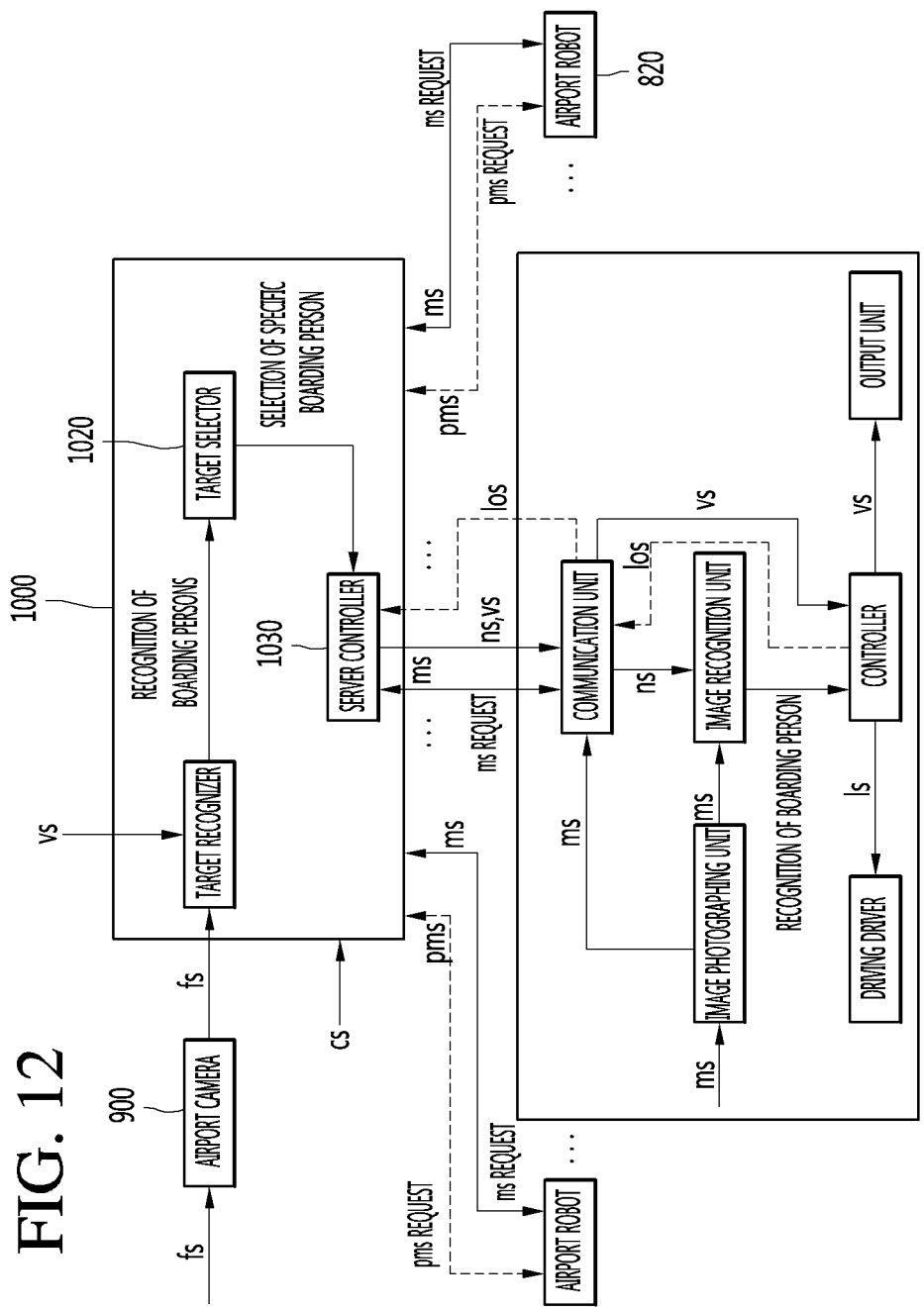
FIG. 12 is a system block diagram illustrating a structure of an airport robot system according to a first embodiment.

FIG. 12 is a system block diagram illustrating a structure of an airport robot system according to a first embodiment.

Referring to FIG. 12, the airport robot system may include airport robots 810 to 820, an airport camera 900, and a server 1000.

When the server 1000 requests image information ms, the airport robots 810 to 820 may photograph the image information ms about boarding-scheduled persons located in a set region and may transmit the image information ms to the server 1000.

First, the airport camera 900 may photograph a facial image fs of each of ticket-issued persons of a flight-scheduled airplane.

At this time, the airport robot 900 may be disposed in a ticket issuing window, but is not limited thereto.

The server 1000 may obtain mobile terminal information cs about each of the ticket-issued persons when issuing tickets and may store the facial image fs photographed by the airport camera 900 so as to match the mobile terminal information cs about each of the ticket-issued persons.

In this case, the server 1000 may include a target recognizer 1010, a target selector 1020, and a server controller 1030.

When flight change information vs about a flight-scheduled airplane is input from an external input device (not shown), the target recognizer 1010 may request image information ms from each of the airport robots 810 to 820 and may recognize boarding persons matching the facial image fs of each of the ticket-issued persons among the boarding-scheduled persons, based on the image information ms and the facial image fs transmitted from each of the airport robots 810 to 820.

The flight change information vs may include at least one of a changed departure time, a changed boarding time, and a changed boarding gate each corresponding to the flight-scheduled airplane.

The target selector 1020 may select a specific boarding person satisfying a set criterion among the boarding persons recognized by the target recognizer 1010.

In this case, the set criterion may be at least one of a person who does not board at the changed departure time, a person who does not reach a boarding gate at the changed boarding time, and a person who does not reach the changed boarding gate, at a position of each of the boarding persons, but is not limited thereto.

That is, the target selector 1020 selects the specific boarding person satisfying the set criterion among specific persons corresponding to the flight change information, and for example, may select, as the specific boarding person, a person satisfying the set criterion from among the specific persons because it is not easy to move due to the injury of a body, but is not limited thereto.

Moreover, the target selector 1020 may calculate a position lo of each of the boarding persons, based on positions of the airport robots 810 to 820 and set positions of auxiliary facilities.

The server controller 1030 may perform control so that, in selecting the specific boarding person, a specific airport robot 812 which has transmitted image information ms about the specific boarding person among the airport robots 810 to 820 recognizes flight change information vs or transfers the flight change information vs to the specific boarding person.

That is, the server controller 1030 may transmit movement information ns moving to a set position ls corresponding to a position lo of the specific boarding person calculated by the target selector 1020 and the flight change information vs to a specific airport robot 812 close to the specific boarding person among the airport robots 810 to 820.

Moreover, when a position deviation information los transmitted from the specific airport robot 812 is received after the movement information ns and the flight change information vs are transmitted, the server controller 1030 may request current image information pms from other airport robots except the specific airport robot 812 of the airport robots 810 to 820.

Subsequently, when the server controller 1030 receives the current image information pms, the server controller 1030 may perform control so that the server controller 1030 transmits the movement information ns and the flight change information vs to another specific airport robot matching a re-checked position of the specific boarding person to allow the specific boarding person to recognize the movement information ns and the flight change information vs.

The airport robots 810 to 820 may include the same elements. In an embodiment, a control configuration of the specific airport robot 812 will be described.

The specific airport robot 812 may include a communication unit 831, an image photographing unit 832, an image recognizer 833, a driving driver 834, an output unit 835, and a controller 836.

In an embodiment, it will be described that the airport robots 810 to 820 are located in another gate region differing from a boarding gate region of a flight-scheduled airplane at a current time, and when a boarding person of the flight-scheduled airplane is located in the other gate region, the airport robots 810 to 820 provide the boarding person with a service which allows the boarding person to move the boarding gate region of the flight-scheduled airplane.

Here, the communication unit 831 may transmit image information ms to the server 1000 and may transmit position deviation information ps to the server 1000 according to control by the controller 836, and the communication unit 831 may receive movement information ns and flight change information vs from the server 1000.

In an embodiment, the communication unit 831 may be the LTE router 162 included in the user interface unit 160 illustrated in FIG. 2, but is not limited thereto.

The image photographing unit 832 may photograph image information ms about boarding-scheduled persons located in a current gate region differing from the boarding gate region.

In an embodiment, the image photographing unit 832 may be the 2D camera 171 and the RGBD camera each illustrated in FIG. 2, but is not limited thereto.

The image photographing unit 832 may continually photograph, by units of set sectors, the boarding-scheduled persons located in the current gate region and may transfer a captured image to the communication unit 831 and the controller 836.

When the movement information ns is received from the server 1000, the image recognizer 833 may recognize the specific boarding person matching a set position ls included in the movement information ns in the image information ms.

In an embodiment, the image recognizer 833 may be the recognition data processing module 173 illustrated in FIG. 2, but is not limited thereto.

The image recognizer 833 may match positions lo and set positions ls of the boarding-scheduled persons included in the image information ms to recognize the same boarding-scheduled person as the specific boarding person.

The driving driver 834 may drive a motor to a position corresponding to a position of the boarding person recognized by the image recognizer 833 according to control by the controller 836 to move.

In an embodiment, the driving driver 834 may be the same as the driving driver 140 illustrated in FIG. 2, but is not limited thereto.

The output unit 835 may output flight change information vs to the specific boarding person according to control by the controller 836.

In an embodiment, the output unit 835 may be the touch monitor 166 which is included in the user interface unit 160 illustrated in FIG. 2 and displays the flight change information vs and the speaker 167 which is included in the user interface unit 160 illustrated in FIG. 2 and guides the flight change information vs as a voice, but is not limited thereto.

Here, the controller 836 may be at least one of the microcomputer 110 and the AP 150 each illustrated in FIG. 2, but is not limited thereto.

The controller 836 may control the driving driver 834 to move to the set position ls of the specific boarding person according to the movement information ns.

Subsequently, when controller 836 controls the driving driver 834 to move to the set position ls, the controller 836 may control the output unit 835 to output the flight change information vs to the specific boarding person.

Moreover, when the controller 836 does not recognize the specific boarding person, the controller 836 may control the communication unit 831 to transmit the position deviation information los about the specific boarding person to the server 1000.

In the airport robot system according to an embodiment, a server selects a specific boarding person and allows the specific boarding person to recognize flight change information about a flight-scheduled airplane with a specific airport robot of airport robots, and there is an advantage for providing a service which enables the specific boarding person to smoothly board.

According to an embodiment of the present invention, the above-mentioned method can be embodied as computer readable codes on a non-transitory computer readable recording medium having a program thereon. Examples of the computer readable recording medium include ROM, RAM, CD-ROM, magnetic tape, floppy disk, and an optical data storage device. Also, the computer can include an AP 150 of the robot for airport. The above-described display device is not limited to the application of the configurations and methods of the above-described embodiments and the entire or part of the embodiments can be selectively combined and configured to allow various modifications.

The invention claimed is:

1. A robot comprising:
   an image sensor configured to photograph image information about one or more persons located in a first region differing from a second region;
   an image recognizer configured to recognize one of the persons located in the first region as a ticket-issued person when the image information for the person located in the first region corresponds to an image of the ticket-issued person; and
   a controller configured to, based on recognizing the person located in the first region as the ticket-issued person, output movement path information that guides the person located in the first region to the second region,
   wherein the movement path information includes at least one of a movement path from a position of the a ticket-issued person to the boarding gate region, a movement time, or a boarding start time.

2. The robot of claim 1, further comprising a communication interface configured to receive the image of the ticket-issued person from a computing device.

3. The robot of claim 1, further comprising:
   a motor configured to provide a force to move the robot; and
   a user interface configured to output the movement path information.

4. The robot of claim 3, further comprising:
   a controller configured to:
   calculate, based on recognizing the person located in the first region as the ticket-issued person, the position of the ticket-issued person from the image information; and
   control the motor to move the robot to a set position corresponding to the position of the ticket-issued person, and control the user interface to output the movement path information when the robot moves to the set position.

5. The robot of claim 3, wherein the user interface includes at least one of a monitor configured to display the movement path information or a speaker configured to provide audio associated with the movement path information.

6. A robot comprising:
a communication interface configured to receive, from a computing device, facial information and mobile terminal information for a ticket-issued person, and change information related to a ticket issued to the ticket-issued person;
an image sensor configured to photograph image information about persons located in a first region differing from a second region associated with the ticket;
an image recognizer configured to recognize one of the persons located in the first region as the ticket-issued person when the image information for the person corresponds to the facial information for the ticket-issued person; and
a controller configured to, based on recognizing the person in the first region as the ticket-issued person, control the communication interface so that at least a portion of the change information is transmitted to a mobile terminal of the ticket-issued person, based on the mobile terminal information,
wherein the change information includes at least one of a changed departure time, a changed boarding time, or a changed boarding gate that each correspond to a scheduled flight.

7. The robot of claim 6, wherein the controller is further configured to:
based on recognizing the person in the first region as the ticket-issued person, determine whether data identifying a mobile terminal number is included in the mobile terminal information; and
when the mobile terminal information includes the data identifying the mobile terminal number, control the communication interface to transmit the change information based on the mobile terminal number.

8. The robot of claim 7, wherein the controller is further configured to, when the mobile terminal information does not include the data identifying the mobile terminal number, calculate a position of the ticket-issued person in the first region from the image information.

9. The robot of claim 8, further comprising:
a user interface; and
a motor configured to provide a force to move the robot,
wherein, when the position of the ticket-issued person in the first region is calculated, the controller manages the motor to move the robot to a set position based on the position of the ticket-issued person in the first region, and then, controls the user interface to output the change information and the movement path information to guide the ticket-issued person to move to the second region.

10. The robot of claim 9, wherein the user interface includes at least one of a monitor configured to display the change information and the movement path information or a speaker configured to output audio associated with the change information and the movement path information.

11. The robot of claim 6, wherein, when the change information includes data identifying the changed boarding gate, the change information further identifies a movement path from a position of the ticket-issued person in the first region to the changed boarding gate.

12. A robot system comprising:
a camera configured to photograph facial images of ticket-issued persons;
a computing device configured to store mobile terminal information about each of the ticket-issued persons and the facial images mapped to the mobile terminal information, and when change information about tickets issued to the ticket-issued persons is received from an input device, select a specific ticket-issued person satisfying a set criterion from among the ticket-issued persons; and
a plurality of robots configured to, based on a request received from the computing device, collect image information about persons located in a set region and transmit the image information to the computing device,
wherein the computing device includes:
a target recognizer configured to, when the change information is input, recognize a subset of the persons located in the first set region as the ticket-issued persons, based on determining that the image information for the subset of the persons located in the first set region corresponds to the facial images for the ticket-issued persons;
a target selector configured to select the specific ticket-issued person satisfying the set criterion among the persons in the first region; and
a controller configured to, based on the specific ticket-issued person being selected, perform control so that specific robot of the robots transfers the change information to the specific ticket-issued person,
wherein the flight change information includes at least one of a changed departure time, a changed boarding time, or a changed boarding gate that each correspond to a scheduled flight.

13. The robot system of claim 12, wherein
the set criterion relates to identifying, as the specific ticket-issued person, a person who does not board at the changed departure time, a person who does not reach a boarding gate at the changed boarding time, or a person who does not reach the changed boarding gate.

14. The robot system of claim 12, wherein the target selector calculates a position of each of the ticket-issued persons, based on positions of the robots and set positions of auxiliary facilities.

15. The robot system of claim 12, wherein, when the specific ticket-issued person is selected, the controller transmits movement information identifying a set position corresponding to a position of the specific ticket-issued person and the change information to the specific robot, and wherein the specific robot is selected based on being positioned adjacent to the position of the specific ticket-issued person among the robots.

16. The robot system of claim 15, wherein the specific robot includes:
an image sensor configured to photograph, as a portion the image information, one or more of the persons in the first region;
a communication interface configured to transmit the portion of the image information to the computing device and to receive the movement information and the change information from the computing device;
an image recognizer configured to, when the movement information is received from the computing device, recognize the specific ticket issued person matching the set position in the image information; and a controller configured to, based on recognizing the specific ticket-issued person, output the change information to the specific ticket-issued person at the set position.

17. The robot system of claim 16, wherein the specific robot further comprises:

a motor configured to provide a force to move the specific robot to the set position; and a user interface configured to output the change information.

18. The robot system of claim 17, wherein, when the specific robot cannot locate the specific ticket issued person, the controller further controls the communication interface to transmit position deviation information about the specific ticket-issued person to the computing device.

19. The robot system of claim 18, wherein, when the position deviation information from the specific robot is received, the computing device receives current image information from one or more other ones of the robots and transmits the movement information and the change information to another specific robot located at a position corresponding to a re-check position of the specific ticket-issued person.

* * * * *